United States Patent [19]

Mikoll et al.

[11] Patent Number: 4,930,808
[45] Date of Patent: Jun. 5, 1990

[54] PASSENGER RESTRAINT SYSTEM

[75] Inventors: Joseph F. Mikoll, Hopkins, Minn.; Melvin M. Goldfein, 4515 Heathbrooke Cir., Minneapolis, Minn. 55422; John M. Berner, Golden Valley, Minn.

[73] Assignee: Melvin M. Goldfein, Minneapolis, Minn.

[21] Appl. No.: 234,623

[22] Filed: Aug. 22, 1988

[51] Int. Cl.$^5$ .............................................. B60R 21/00
[52] U.S. Cl. .................................. 280/751; 280/801; 297/488
[58] Field of Search ............... 280/748, 751, 752, 753, 280/801; 297/488, 487

[56] References Cited

U.S. PATENT DOCUMENTS

| | | | |
|---|---|---|---|
| 2,749,143 | 6/1956 | Chiko | 280/150 |
| 2,801,866 | 8/1957 | Naslund | 280/150 |
| 2,859,048 | 11/1958 | Munn | 280/751 |
| 2,919,140 | 12/1959 | West | 280/150 |
| 2,923,558 | 2/1960 | Goenewegen | 280/150 |
| 3,198,543 | 8/1965 | Presunka | 280/150 |
| 3,203,709 | 8/1965 | Presunka et al. | 280/751 |
| 3,393,010 | 6/1968 | Steinberg | 297/488 |
| 3,494,633 | 2/1970 | Malloy | 297/487 |
| 3,837,668 | 9/1974 | Barenyi | 280/150 B |
| 3,881,744 | 6/1975 | Tupper | 280/150 |
| 3,924,874 | 12/1975 | Barenyi | 280/150 B |
| 3,934,898 | 1/1976 | Long | 280/150 B |
| 3,938,825 | 2/1976 | Boswell | 280/753 |
| 3,985,374 | 10/1976 | Powaska | 280/748 |
| 4,681,344 | 7/1987 | Maserus | 297/488 |

FOREIGN PATENT DOCUMENTS 449771 3/1913 France ............................... 104/241

Primary Examiner—Kenneth R. Rice
Attorney, Agent, or Firm—James V. Harmon

[57] ABSTRACT

A passive passenger restraint is provided which includes a self-supporting deformable U-shaped restraining bar having a pair of parallel connecting arms that extend forwardly and are supported by hinges at their forward ends with a lap bar joining their rearward ends. The lap bar extends between the rear ends of the arms so that upon impact a portion of the energy is absorbed as the lap bar bends the rear ends of the connecting arms. To assist in holding the bar assembly in place, a flexible restaining strap is provided to extend over and encircle the upper aspect of the arms. The ends of the strap are held securely in place on either side of the seat on which the passengers are seated. The strap is able to slide across the upper surface of the arms to that upon impact the tension in the strap bends the arms towards one another as their upper ends bend forwardly.

16 Claims, 5 Drawing Sheets

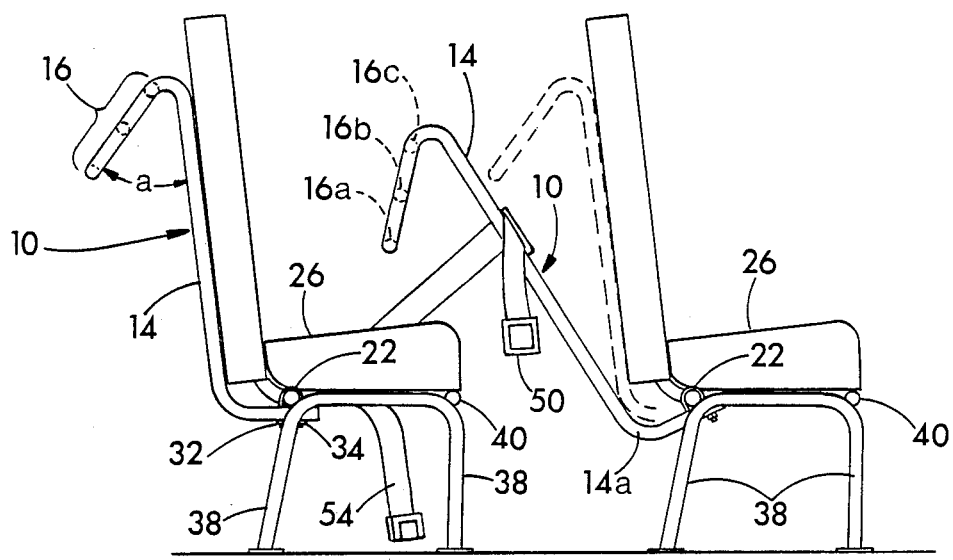
FIG. 1
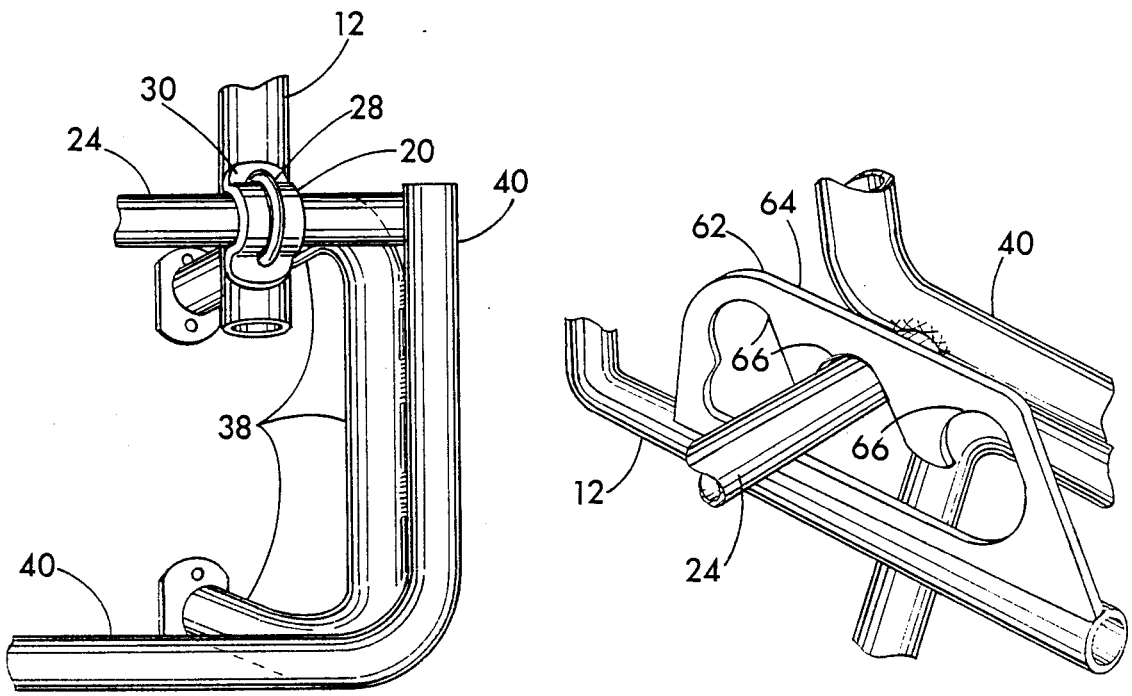
FIG. 2
FIG. 3

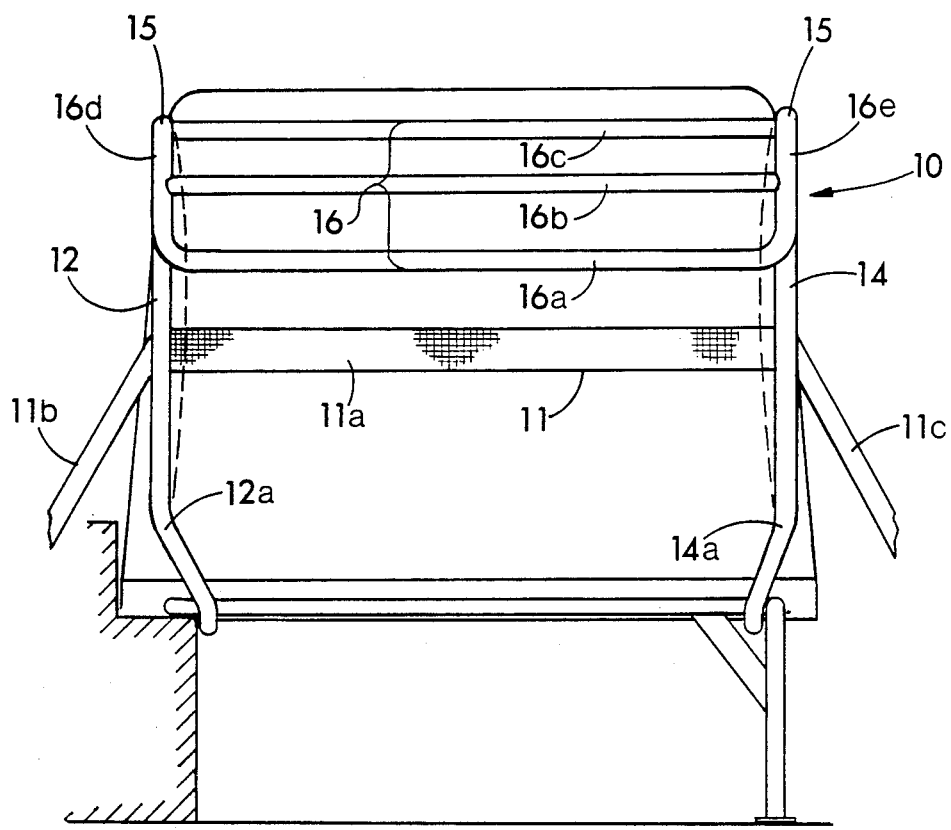
FIG. 4
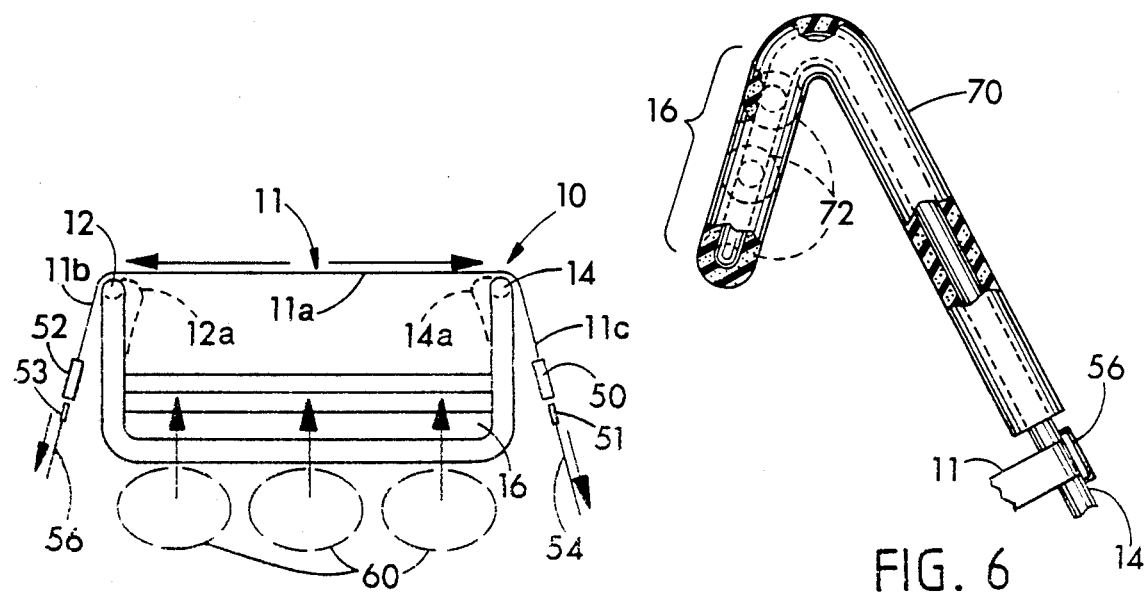
FIG. 5
FIG. 6

PASSENGER RESTRAINT SYSTEM

FIELD OF THE INVENTION

The present invention relates to passive passenger restraint systems for vehicles and more particularly to a restraint system that is suited for use in a variety of vehicles, particularly school buses.

BACKGROUND OF THE INVENTION

While several restraint systems have been proposed for use in vehicles, none are entirely suited for use in a school bus for transporting school children.

U.S. Pat. No. 4,681,344 describes a safety hold-down bar system that employs a U-shaped bar to which is connected a strap for holding the bar in place. The strap, however, holds the bar in place on only one side. This produces an asymmetrical distribution of stresses on impact that can damage or break the restraint. Moreover, virtually all of the G-forces are transmitted undiminished from the lap bar to a pair of spaced connecting arms joined to the lap bar in such a way that there is no opportunity for a portion of the energy to be absorbed by the lap bar. Furthermore, the lap bar is formed from a metal tube that extends across the lower part of the abdomen of each passenger causing impact forces to be concentrated in a small area where they can produce severe discomfort or injury.

In view of these and other deficiencies of the prior art, it is an objective to provide a passenger restraint system with a provision that enables a lap bar to be deflected relative to its support arms thereby absorbing a portion of the impact energy. Another object is to provide a passenger restraint system in which a flexible strap or belt is arranged with respect to a U-shaped restraining bar so that the impact forces are symmetrically distributed and in which the belt is arranged to deflect or deform a portion of the restraint to absorb energy.

A further deficiency of many prior restraints is that a lap bar is constructed to enable the upper portion of the body and head to swing forwardly about the waist as a pivot point, thus allowing the head to strike against a seat back. It is therefore an object of the invention to provide a lap bar which will prevent the body from pivoting forwardly about the waist and will at the same time keep the passengers compartmentalized, i.e. confined to predetermined spaces or compartments while the restraint is in use.

Seat belts when used alone can become folded if they are not drawn tight over the hip, forming a sharp edge that acts somewhat as a knife-like edge and which has in the past caused injury because it tended to slice into the body. Another objective of the invention is to prevent this effect.

These and other more detailed and specific objects of the present invention will be apparent in view of the following description which sets forth by way of example but a few of the various ways in which the present invention can be accomplished within the scope of the appended claims.

SUMMARY OF THE INVENTION

One aspect of the invention is the provision of a passenger restraint for a vehicle that includes a deformable self-supporting, e.g. metal restraint member in the form of a U-shaped bar or bar assembly cooperatively related to an optional flexible restraining belt or strap to encircle at least a portion of the bar so that upon impact the tension of the flexible restraining strap will deform the bar itself by an equal amount on each side to provide predictable deceleration upon impact.

Another aspect of the invention is the provision of a passive passenger restraining system which includes a U-shaped passenger restraint bar having two laterally spaced apart connecting arms pivotally supported at their forward ends and connected by means of a lap bar at their rear ends for engaging the abdomen of the passenger with the lap bar depending downwardly from the rear ends of the support arms so that the lap bar is below the rear ends of the arms whereby upon impact the G-force from the passengers deflect the lap bar forwardly so as to bend the rear ends of the arms downwardly. The lap bar can also be provided with a movable separator bar to assist in compartmentalizing the passengers and with a provision for adjustable positioning of the passenger restraint on a fore and aft axis.

THE FIGURES

FIG. 1 is a side elevational view of the invention.

FIG. 2 is a partial top view on a larger scale showing one mode of pivotally supporting the forward ends of the connecting arms.

FIG. 3 is a perspective view showing a pivotal support that allows forward and rearward adjustment of the passenger restraint.

FIG. 4 is a rear elevational view of the passenger restraint with the belt in place.

FIG. 5 is a diagrammatic top view showing the distribution of G-forces upon impact.

FIG. 6 is a partial side elevational view of the restraint showing one form of foam rubber coating applied to the restraint.

DESCRIPTION OF THE PREFERRED EMBODIMENTS

Figure 7:
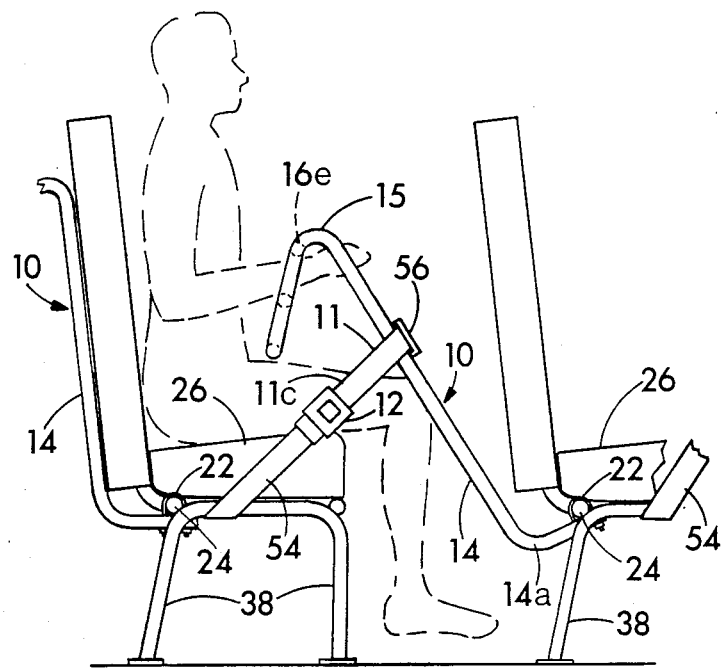
FIG. 7 is a side elevational view of the restraint.
Figure 8:
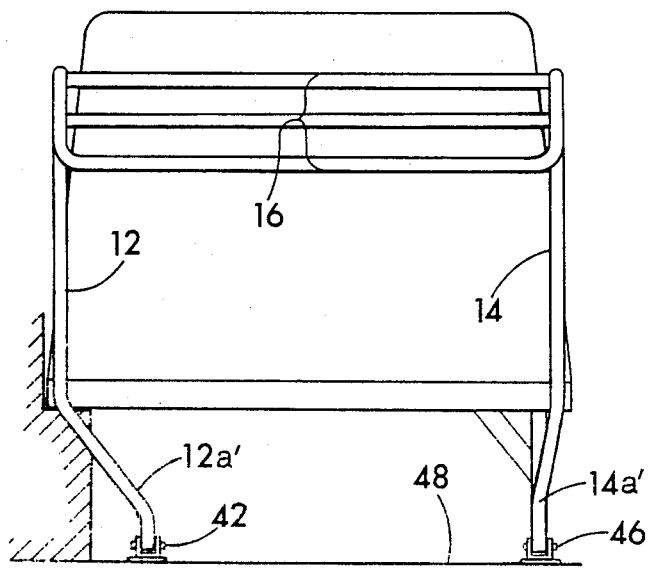
FIG. 8 is a rear elevational view of an alternate form of passenger restraint.

Referring particularly to FIGS. 1, 4 and 7, it will be seen that the invention provides a passive passenger restraint system for a vehicle including a self-supporting passenger restraint 10 of generally U-shaped configuration including a pair of parallel, laterally spaced apart forwardly and downwardly inclined connecting arms 12 and 14 that are joined at their upper ends by means of a lap bar 16 composed of three separate parallel laterally extending bars 16a, 16b and 16c. During use, the lap bar 16 rest in the lap of the passenger with the tubes 16a–16c collectively serving as a generally upright passenger restraining surface that will engage a substantial portion of the passenger's abdomen upon impact. In this way, the tubes 16a–16c cooperate with each other to form a restraining surface of substantial height, e.g. 6 to 12 inches in height to prevent the passenger from swinging forward at the waist upon impact and sustaining possible head injury. The restraint 10 can be suitably supported at its forward end, e.g. by supporting the forward ends of the arms 12 and 14 on pivots 20 and 22 connected to an existing part of the seat ahead, such as a horizontal seat bar 24 that forms a part of a conventional seat 26. Any suitable hinge can be used such as a U-bolt 28 engaged over a small strip of plastic 30 and held in place by means of nuts 32 and 34. In this way the restraint consisting of the arms 12, 14 and the lap bar 16 will swing up and down about pivots 20, 22 on the bar 24 as passengers raise and lower the restraint 10 to enter or leave.

It should also be noticed that the lap bar 16 depends downwardly from the rear ends of the arms 12, 14 at an acute angle "a". The angle "a" is not considered critical but can be from about 30° to 45° depending upon the height of the pivot 20. If the pivot 20 is raised the angle "a" will be increased while if it is lowered the angle "a" can be reduced. In the form shown the lap bar tube 16a is integral with downwardly bent portions 16d and 16e of the rear ends of the arms 12 and 14. The tubes 16b and 16c in this case are separate pieces that are welded in place at their ends to the tube sections 16d and 16e.

Figure 9:
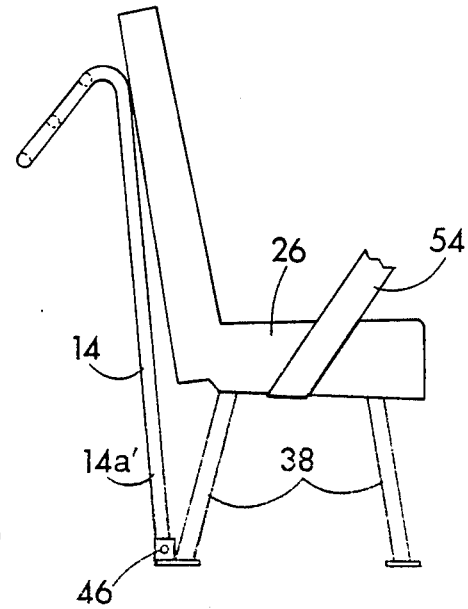
FIG. 9 is a side elevational view of the passenger restraint of FIG. 8.
Figure 10:
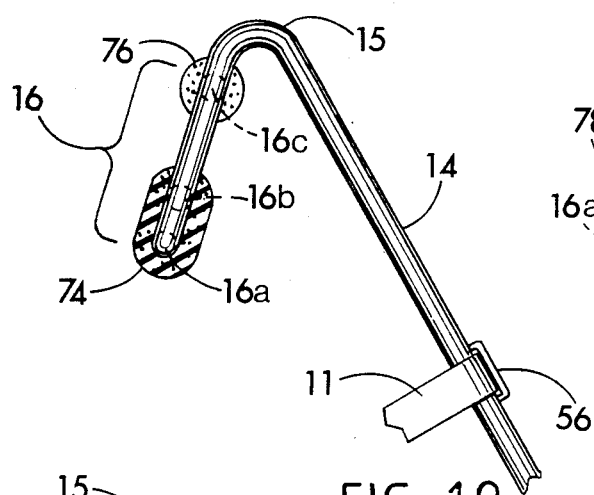
FIG. 10 is a partial side elevational view of an alternate form of rubber coating for the restraining device.

For the purposes of illustration the seats 26 comprise standard bus seats of the type found in school buses used for transporting children, two such adjacent seats being shown in FIGS. 1 and 7. The seats 26 include a conventional leg assembly 38 having floor plates allowing them to be screwed to the floor and horizontally disposed crossmembers including the tube 24 and a parallel tube 40 at the forward edge of the seat. In this way the seat 26 itself provides a secure support for the passenger restraint 10. However, if desired the passenger restraint assembly 10 can be pivoted to a strut or other support means (not shown) that is mounted on the floor separate from the seat 26. In an alternative form as shown in FIGS. 9 and 10, the passenger restraint assembly 10 is provided with arms 12, 14 having lower end portions $12a^1$ and $14a^1$ of sufficient length to extend all the way to the floor where they are connected by means of pivots 42 and 46 to the floor of the vehicle 48 which serves as a support means instead of to the seat 26. In any event a secure support means is provided for pivotally supporting the forward end of the restraint assembly 10.

It will be seen by reference to FIGS. 1 and 7 that the arms 12, 14 bend forwardly at their lower ends as indicated at 12a, 14a. This gives the restraint assembly 10 a generally Z-shaped configuration as seen from the side (FIGS. 1 and 7). The tubing 10 can be formed from a variety of materials such as metal or plastic but 14–18 gauge steel tubing is typical. The restraint assembly 10 is self-supporting and deformable under impact. During a crash, the lap bar 16 tends to bend downwardly to absorb a portion of the energy. There is also a tendency for the bends 12a, 14a at the lower ends of the arms to bend further, thereby absorbing additional energy. In this way a generally U-shaped self-supporting passenger restraint assembly 10 is provided with connecting arms having a lap bar that depends downwardly from the rear ends of the connecting arms so that the lap bar is below their rearward ends. The impact causes the passengers to deflect the lap bar 16 forwardly, thereby bending the rear ends of the arms 12, 14 downwardly so as to absorb energy and provide predictable deceleration of the passenger upon impact.

The restraint assembly 10 can also be held in place by means of an optional flexible strap or belt 11 which includes a center section 11a engaged over the arms 12, 14 as well as diagonally-oriented downwardly extending end sections 11b and 11c connected by means of clasps 50 and 52 to fixed strap portions 54 and 56. The belt 11 encircles the restraint 10 and is held in place around the upper portions of the arms 12 and 14 by means of guide loops 56a which allow the belt 11 to slide back and forth over the upper surfaces of the arms 12, 14.

Figure 14:
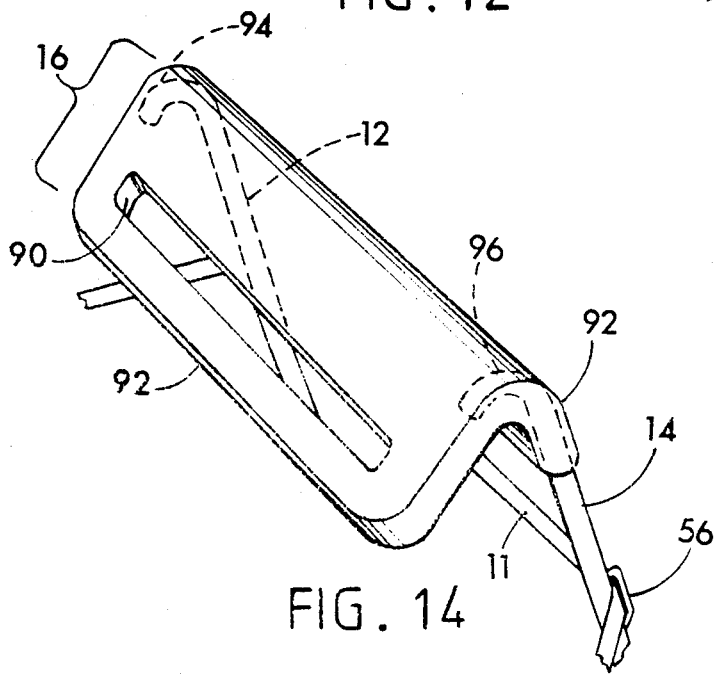
FIG. 14 is a perspective view of a modified form of lap bar in accordance with the present invention.

The action of the restraint 10 can be best understood by reference to FIGS. 5 and 14. As shown in FIG. 5, three passengers 60 are thrown forwardly against the lap bar 16. As the force of the impact is transferred to the lap bar 16, increasing stress is placed on the strap 11 causing it to stretch. As the force on the center section 11a increases, the connecting arms 12 and 14 will be deflected centrally a small amount by the strap as shown at 12a and 14a in FIG. 5, thereby absorbing a portion of the impact force. Thus, while the elasticity of the strap 11 allows the energy to be transferred back into the system when released forcing the passengers back into their seats, deflection 12a, 14a of the self-supporting restraint 10 provides additional energy absorption. It is also important to note that because the strap encircles the restraint 10 and is connected to the floor straps 54, 56 on either side, stresses are evenly distributed; this prevents load applied by on the strap from being concentrated on one side of the seat as in some prior devices.

To accommodate passengers of different sizes, the invention is optionally provided, if desired, with an adjustment means 62 shown in FIG. 3 including an adjustment plate 64 welded or otherwise connected to the lower end of each of the arms 12, 14 and having a plurality of recesses 66 adapted to engage the bar 24. Thus, by placing the bar 24 in different recesses 66, the passenger restraint 10 can be moved toward the front or rear to accommodate passengers of different sizes.

Figure 11:
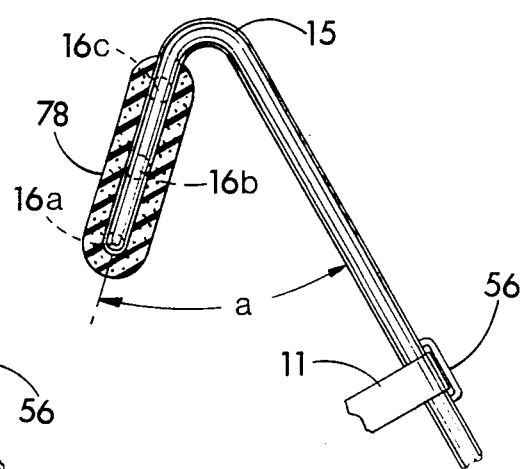
FIG. 11 is a view similar to FIG. 10 of another form of foam rubber or plastic coating.

Refer now to FIG. 6 which illustrates a foam rubber covering 70 applied to the rear end of both of the arms 12, 14 and the lap bar 16. In this case the rubber covering consists of foam rubber tubing 72 engaged over each of the crossbars 16a–16c. In FIG. 10 a larger piece of foam rubber 74 is engaged over both of the lower tubes 16a and 16b while a separate tubular cover of foam rubber 76 is engaged over the bar 16c. In FIG. 11 a single foam rubber body 78 is engaged over all of the bars 16a–16c.

FIG. 14 illustrates how upon impact the tops of arms 12 and 14 also bend forwardly in addition to being deflected centrally as shown in FIG. 5. This occurs when the strap 11 is stretched to its limit so that additional energy developed by the passengers thereafter bends the upper ends of the arms 12, 14 forwardly as shown by dotted lines in the figure. As this occurs it can also be seen that the lower edge of the lap bar 16 will be deflected downwardly as already described.

Figure 12:
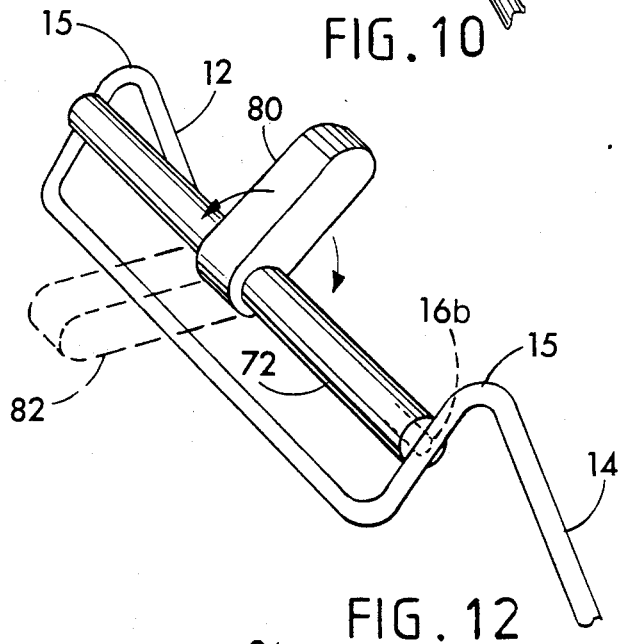
FIG. 12 is a perspective view of a modified form of the invention including a movable passenger separator arm.
Figure 13:
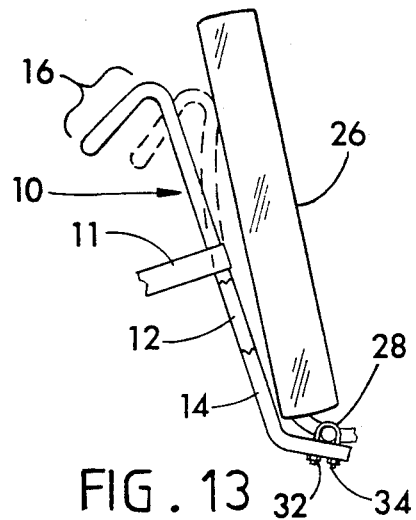
FIG. 13 is a view showing the manner in which the passenger restraining device of the invention is deformed upon impact.

Refer now to FIG. 12 which illustrates another embodiment of the invention. As shown in FIG. 12 the bar 16b is provided with a passenger separator arm 80 pivotally supported at one end to the bar 16b so as to be free to swing in a vertical plane between an operating position 82 located between the passengers for holding them apart. This embodiment of the invention is particularly useful for handicapped persons who may tend to fall toward one side after being placed in a seat.

Refer now to FIG. 14. In FIG. 14 is shown a lap bar 16 formed from injection molded plastic. The bar 16 has a transversely extending elongated opening 90 near its lower edge 92 that can serve as a handhold. The upper end of the molded lap bar 16 bends forwardly at 92 and is provided with sockets to receive the upper ends 94 and 96 of the arms 12 and 14, respectively, which have been cut short for this purpose. In this way, the injection molded plastic lap bar 16 is mounted on the upper ends 94 and 96 of arms 12, 14 and is bonded in place, e.g. by means of adhesive and if desired with screw fasteners (not shown).

From the description given it will be seen that passengers can easily enter and leave and are compartmentalized by the restraint 10. Moreover, impact energy is absorbed by the combined effect of the belt 11 and the deformable self-supporting U-shaped restraint 10. The belt 11 encircles the arms 12, 14 to provide symmetrical distribution of forces and is able to slide over the arms upon impact so that the passenger restraint 10 is self-centering, that is to say centers itself between the end portions 12b and 12c of the strap 11 on either side thereof. In addition, the belt 11 holds the arms 12, 14 together upon impact and deflects their centers toward each other as shown in FIG. 5 to absorb a portion of the energy by deforming the steel tubing. Energy is also absorbed as the lap bar 16 bends downwardly at the bends 15 and by bending where the tubes are bent near their lower ends at 12a and 14a.

The restraint is very effective in keeping the passengers in a seated condition. This is important, particularly in the case of school children. It also compartmentalizes them, i.e. confines them to a particular location or space.

Another advantage of the invention is that the restraint can be original equipment or retrofitted in an existing vehicle such as a school bus.

The belt 11 can be provided with a latch 50, 52 on either side as shown in FIG. 5 or, in a bus where the passengers always exit from the same side, the latch 52 can be eliminated.

It will also be seen that the provision of a lap bar 16 having a predetermined height which extends over a substantial portion of the passenger's abdomen distributes the impact over a large part of the body as well as preventing the body from swinging forwardly at the hips, thereby reducing the opportunity for head injuries. When employed in a school bus, the driver can check to make sure that all of the students are in place with the belts latched by looking through a rearview mirror inside the bus.

During use, the bar 16 rests on the hip or lap of the passengers, securely holding them in place. Additional security is provided if desired by the flexible restraining strap 11. The invention is very effective in keeping the passengers in a seated position because the lap bar 16 is located rearwardly of the seat edge on which the passengers are seated. If an attempt is made to stand, the weight of the bar makes standing upright difficult and the position of the lap bar behind the front edge of the seat cushion beneath the passenger keeps the passenger bent at the waist with the hips well to the rear of the feet. This makes it difficult to stand. The invention also helps to reduce rollover injuries and to hold the passenger's legs so that they do not extend into the aisle.

Figure 15:
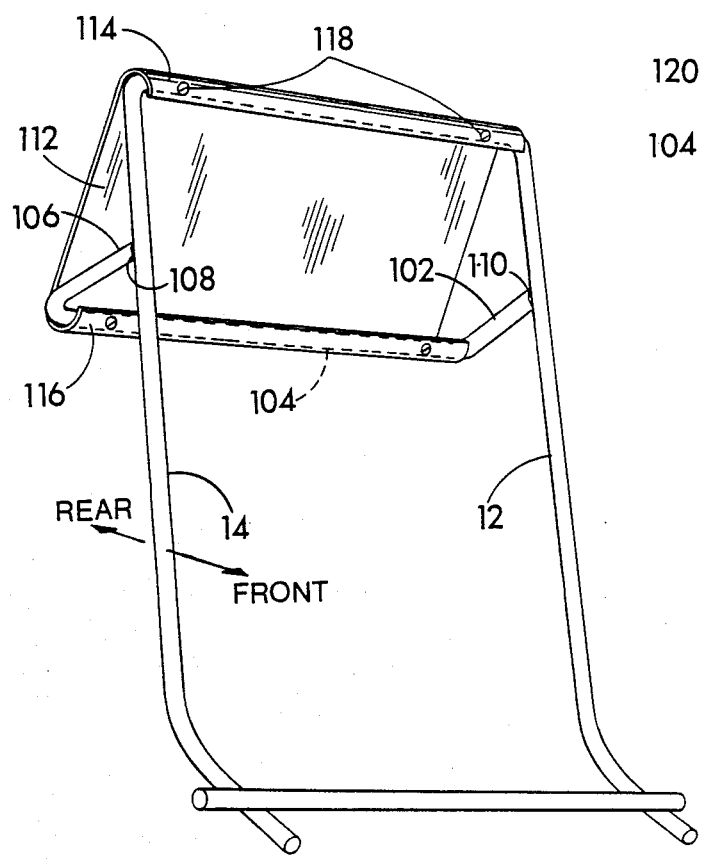
FIG. 15 is a perspective view of a modified form of passenger restraint in accordance with the present invention.
Figure 19:
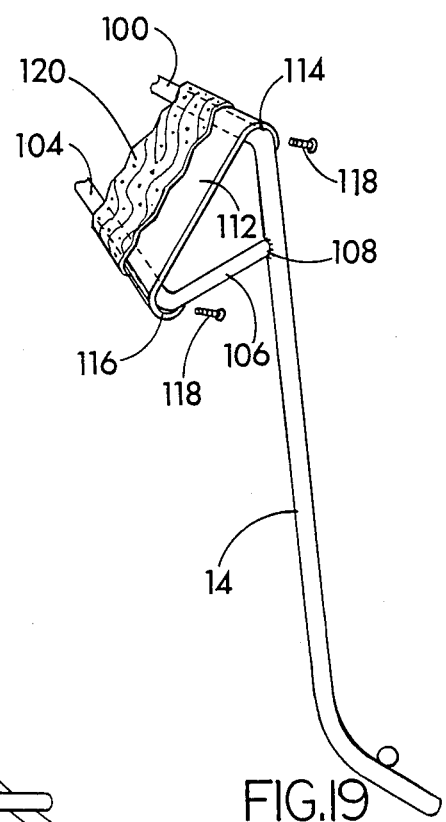
FIG. 19 is a partial perspective view of the restraint of FIG. 15.
Figure 16:
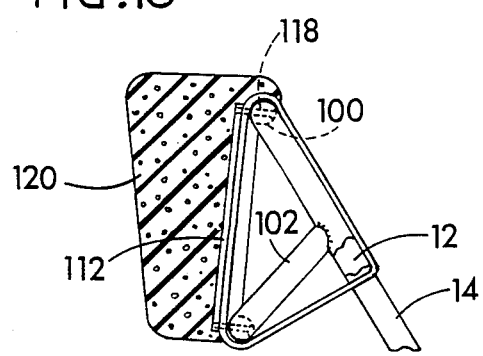
FIG. 16 is a side elevational view of the top portion of the restraint of FIG. 16 partly in section.
Figure 17:
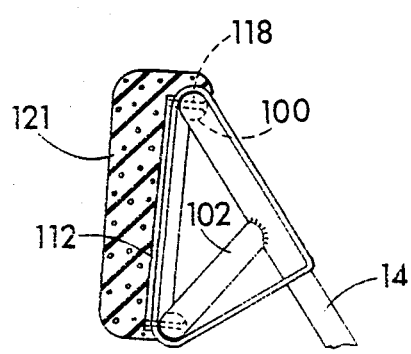
FIG. 17 is a view of another form of foam rubber pad that can be used in accordance with the invention.

Another form of restraint shown in FIGS. 15 and 19 includes diagonal upwardly and rearwardly extending parallel arms 12 and 14 similar to those already described but connected together at their upper ends by means of an integral intermediate connecting tube portion 100. Suitably connected as by means of welding at 108 and 110 to the arms 12, 14 is a second tube composed of parallel legs 102, 106 which are connected together by means of an intermediate or center portion 104. It will be seen that the legs 102, 106 extend rearwardly and downwardly from a point near the upper end of the arms 12, 14. Fastened between the connecting portions 100 and 104 of the U-shaped tubes is a mounting plate or frame 112 of metal or plastic that can be suitably secured to the tube sections 100, 104 by being curled around them at their upper and lower ends as shown at 114 and 116 and held permanently in place by means of fasteners such as screws 118. The plates 112 can terminate adjacent tubes 100, 104 as shown in FIGS. 16 and 20 or, if desired, can continue as shown in FIGS. 16 and 17 to reside in a plane across the front of the arms 12, 14 and to extend thence rearwardly so as to be connected to the forwardly curled portion 116 of FIGS. 15 and 19. This completely encloses the upper ends of the arms 12, 14 and the frame member 102-106 to provide an attractive appearance.

A lap bar pad having and of a variety of shapes as shown for example in FIGS. 16 and 17 is suitably secured to the mounting plate 112 as by means of an adhesive or otherwise. During an impact, the forward force applied to pad 120, 121 as the case may be, will tend to deflect the lower end of the frame 102-106 downwardly and at the same time will tend to stretch the mounting plate 112. This is highly advantageous since the impact energy can in this way be absorbed in part within the lap bar itself.

Figure 18:
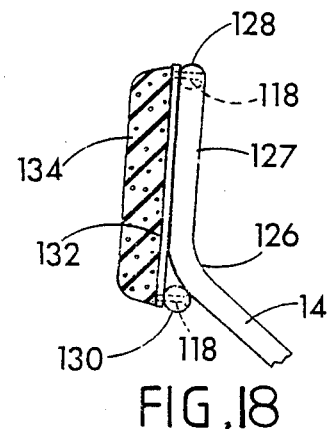
FIG. 18 is a cross-sectional view of still another form of passenger restraint.

Another form of lap bar is shown in FIG. 18. In this example, the upper ends 127 of both of the arms 12, 14 bend upwardly at 126 and are connected together at their upper ends by means of integral, horizontally disposed, laterally extending intermediate tubular portion 128. A horizontally disposed tube 130 can be welded parallel to tube portion 128 between the arms 12, 14 at the bend 126. A support plate 132 is fastened by means of screws 118 to the tubes 128, 130 and a pad such as a foam rubber pad 134 is suitably bonded to the support plate 132 to define the lap bar. In this case, the lap bar and pad 134 upon impact will tend to bend the upper ends of the arms 12, 14 and the tube portion 128 forwardly, accentuating the bend 126 to thereby absorb a portion of the impact energy.

Many variations within the scope of the appended claims will be apparent to those skilled in the art once the principles of the invention described herein are understood.

What is claimed is:

1. A passive passenger restraint system for a vehicle comprising, a self-supporting restraining member of U-shaped configuration including a horizontally disposed laterally extending lap bar, connecting arms extending forwardly from the lap bar, pivots at the forward ends of the connecting arms supporting the passenger restraint and allowing the connecting arms and lap bar to swing up and down about said pivots, and a flexible restraining belt connected at each end to a fixed support means and encircling the restraint assembly whereby upon impact the resuling tension within the flexible restraining belt bends the connecting arms as the G-forces from the passenger are transferred to the lap bar and to the belt, the connecting arms are downwardly and forwardly inclined and said belt encircles both of said arms and is free to slide laterally across the front of each of the arms whereby upon impact the lap bar is thrown forwardly, thereby applying pressure to the belt such that the belt has a self-centering action upon the passenger restraint by distributing impact forces symmetrically on each side of the restraint to thereby center the restraint assembly during use.

2. The passenger restraint of claim 1 wherein upon impact the arms bend in an arc with the center portions thereof being restrained by the belt and the upper ends thereof being deflected forwardly.

3. A passive passenger restraint system for a vehicle comprising, a self-supporting restraining member of U-shaped configuration including a horizontally disposed laterally extending lap bar, connecting arms extending forwardly from the lap bar, pivots at the forward ends of the connecting arms supporting the passenger restraint and allowing the connecting arms and lap bar to swing up and down about said pivots, and a flexible restraining belt connected at each end to a fixed support means and encircling the restraint assembly whereby upon impact the resulting tension within the flexible restraining belt bends the connecting arms as the G-forces from the passenger are transferred to the lap bar and to the belt, the connecting arms having bends at their ends with the rear end of each arm extending in a generally upright position from the bend therein to define two laterally spaced apart upright members located distally of the bends, the lap bar comprises an abdomen and chest-engaging surface of predetermined height connected between the upright members to serve as an extended support for engaging the abdomen and chest of a passenger over a substantial area and to thereby prevent passengers from swinging forwardly about the waist.

4. A passive passenger restraint system for a vehicle comprising, a self-supporting restraining member of U-shaped configuration including a horizontally disposed laterally extending lap bar, connecting arms extending forwardly from the lap bar, pivots at the forward ends of the connecting arms supporting the passenger restraint and allowing the connecting arms and lap bar to swing up and down about said pivots, and a flexible restraining belt connected at each end to a fixed support means and encircling the restraint assembly whereby upon impact the resulting tension within the flexible restraining belt bends the connecting arms as the G-forces from the passenger are transferred to the lap bar and to the belt, the connecting arms having rear ends defining the location of the lap bar, at least a pair of laterally extending vertically spaced apart lap bar support members connected between the rear ends of the connecting arms, a mounting plate connected at vertically spaced apart points to the laterally extending horizontally disposed lap bar support members, an energy absorbing pad is affixed to a rearwardly facing surface of said mounting plate whereby in a crash the impact of the passenger will tend to compress the pad against the plate so that impact energy is absorbed at least in part within the lap bar itself.

5. The lap bar of claim 4 wherein said pad extends upwardly above the uppermost of said pair of lap bar support members to help prevent injury to the passenger.

6. A generally U-shaped passenger restraint having a pair of laterally spaced connecting arms extending rearwardly, members pivotally supporting the front ends of said arms, a lap bar joining the rear ends of the arms and adapted to engage the abdomen and chest of the passenger, said lap bar depending downwardly from the arms so that the lap bar is positioned below the rearward ends of the arms whereby upon impact G-forces developed by the passenger will deflect the lap bar forwardly and bend the rear ends of the arms downwardly as the lower end of the lap bar is thrown forwardly thereby absorbing the energy of the impact to provide deceleration for the passenger.

7. The passenger restraint of claim 6 wherein said arms are formed from a deformable substance and have a Z-shaped configuration including a forward bend at the lower end thereof whereby upon impact the arms are adapted to bend at a point adjacent to the lap bar and at a point adjacent to their lower ends to absorb impact energy.

8. The passenger restraint of claim 6 wherein said lap bar includes a passenger separator arm pivotally secured to the lap bar for pivotal movement in a vertical plane extending through the lap bar to an operative position projecting rearwardly of the lap bar to separate passengers from one another.

9. The passenger restraint of claim 6 wherein the lap bar comprises a generally planar elongated transversely extending upright body to define a passenger restraining surface of extended height adapted for engaging a substantial portion of the abdomen and chest of the passengers to prevent the passengers from swinging forwardly at the waist.

10. The passenger restraint of claim 9 wherein the lap bar comprises a body formed from synthetic plastic resinous material and said support arms extend forwardly therefrom.

11. The apparatus of claim 6 wherein at least a portion of the lap bar is covered with an energy-absorbing elastic coating.

12. The passenger restraint of claim 9 wherein the lap bar comprises an injection molded horizontally extending transversely disposed plate having a pair of spaced apart sockets and the arms have rear ends that are mounted in the sockets.

13. The passenger restraint of claim 9 wherein the arms are pivotally supported at their forward ends and a flexible restraining strap extends across the upper aspect of the arms to thereby encircle the arms, the strap includes lower end portions that provide a secure support therefor whereby the G-forces applied to the lap bar by the passengers is transferred to the strap and the tension on the strap extending between the arms deflects the arms toward one another to absorb a portion of the energy resulting from the impact.

14. The passenger restraint of claim 13 wherein guide loops are provided to support the strap on the arms and a releasable connecting latch is provided in the strap on either side of the passenger restraint to permit passenger entry from either the left or the right.

15. A passive passenger restraint for a bus comprising a restraint member formed of deformable self-supporting restraining members comprising laterally spaced apart connecting arms, the connecting arms having bends at their rear ends with the rear end of each arm extending in a generally upright position from the bend therein to define two laterally spaced apart upright members, said arms being hinged to a support means ahead of the restraint and said restraint including a laterally extending generally upright self-supporting lap bar defining a passenger restraining surface of extended height connected at each end between the upright members, said lap bar comprising an abdomen and chest engaging surface of predetermined height to serve as a support for vertically spaced apart portions of the trunk of the passenger for engaging a substantial portion of the abdomen and chest of each passenger to thereby prevent the passenger from swinging forwardly about the waist and said restraint being adapted to bend upon impact to absorb energy.

16. A passive passenger restraint system for a vehicle comprising, a self-supporting restraining member of U-shaped configuration including a horizontally disposed laterally extending lap bar, connecting arms extending forwardly from the lap bar, pivots at the forward ends of the connecting arms supporting the passenger restraint and allowing the connecting arms and lap bar to swing up and down about said pivots, and a flexible restraining belt connected at each end to a fixed support means and encircling the restraint assembly whereby upon impact the resulting tension within the flexible restraining belt bends the connecting arms as the G-forces from the passenger are transferred to the lap bar and to the belt, the lap bar includes parallel laterally extending, horizontally disposed upper and lower spaced apart frame members, a connecting plate affixed between the horizontal frame members, an energy absorbing pad affixed to a rearwardly facing surface of said plate and adapted upon impact to absorb energy within the lap bar.

* * * * *